(12) United States Patent
Kang et al.

(10) Patent No.: US 11,527,804 B2
(45) Date of Patent: Dec. 13, 2022

(54) BATTERY MODULE INCLUDING STACKED BATTERY CELLS

(71) Applicant: SK INNOVATION CO., LTD., Seoul (KR)

(72) Inventors: Ji Eun Kang, Daejeon (KR); Sun Mo An, Daejeon (KR); Hae Ryong Jeon, Daejeon (KR); Young Sun Choi, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 106 days.

(21) Appl. No.: 17/086,711

(22) Filed: Nov. 2, 2020

(65) Prior Publication Data

US 2021/0135179 A1    May 6, 2021

(30) Foreign Application Priority Data

Nov. 1, 2019 (KR) ................ 10-2019-0138729

(51) Int. Cl.
| | |
|---|---|
| *H01M 50/502* | (2021.01) |
| *H01M 10/42* | (2006.01) |
| *H01M 10/48* | (2006.01) |
| *H01M 50/54* | (2021.01) |

(52) U.S. Cl.
CPC ....... *H01M 50/502* (2021.01); *H01M 10/425* (2013.01); *H01M 10/482* (2013.01); *H01M 10/486* (2013.01); *H01M 50/54* (2021.01)

(58) Field of Classification Search
CPC ............ H01M 10/425; H01M 10/482; H01M 10/486; H01M 50/502; H01M 50/54
See application file for complete search history.

(56) References Cited

U.S. PATENT DOCUMENTS

| | | | |
|---|---|---|---|
| 2010/0247996 A1* | 9/2010 | Ijaz ................... | H01M 10/6551 429/178 |
| 2015/0140380 A1* | 5/2015 | Kang ................. | H01M 50/553 429/90 |
| 2015/0371786 A1* | 12/2015 | Yang .................. | H01M 50/124 429/153 |
| 2019/0341594 A1* | 11/2019 | Morisato ............. | H01M 50/502 |

* cited by examiner

*Primary Examiner* — Jimmy Vo
(74) *Attorney, Agent, or Firm* — IP & T Group LLP

(57) ABSTRACT

A battery module includes: a plurality of battery cells which have positive electrode tabs and negative electrode tab formed at both ends thereof, respectively, wherein the plurality of battery cells are stacked; a first bus bar assembly having first bus bars to which the positive electrode tabs and the negative electrode tabs located at one end of the battery cells are connected; a second bus bar assembly having second bus bars to which the positive electrode tabs and the negative electrode tabs located at the other end of the battery cells are connected; and a sensing unit which is connected to any one bus bar of the first and second bus bars to detect states of the battery cells.

11 Claims, 4 Drawing Sheets

BATTERY MODULE INCLUDING STACKED BATTERY CELLS

CROSS-REFERENCE TO RELATED APPLICATION

This application claims priority to Korean Patent Applications No. 10-2019-0138729 filed on Nov. 1, 2019 in the Korean Intellectual Property Office, the entire disclosure of which is incorporated by reference herein.

BACKGROUND OF THE INVENTION

1. Field of the Invention

The present invention relates to a battery module, and more specifically, to a battery module having an improved structure.

2. Description of the Related Art

As alternative plans to solve problems of air pollution with the existing gasoline vehicle, diesel vehicle, and the like using fossil fuels, a secondary battery has been drawn as a power source for an electric vehicle (EV), a hybrid electric vehicle (HEV) and the like.

Meanwhile, in order to load the secondary battery in the vehicle, it is required to improve an energy density and solve a problem entailed in spatial constraints. As a means for achieving the requirements, a long-width battery cell having a much longer edge length between electrode tabs than an edge, n which the electrode tabs are located, has been proposed. A general battery cell has a width of 300 mm or less, whereas the long-width battery cell has a width of 600 mm, and an ultra-long-width battery cell is designed to have a width of 600 mm or more.

However, the long-width or ultra-long-width battery cell has a problem that the length between the electrode tabs is increased and an internal resistance of the cell also is increased, thereby causing a large loss of power. In addition, since a difference in the temperature of each region of the battery cell is large, there are problems that the performance of the battery cell is deteriorated and the lifespan thereof is also reduced, and it may be accompanied by a problem that the ultra-long-width battery cell is bent due to its own weight. Therefore, continuous monitoring for performance information of the battery cell is required.

SUMMARY OF THE INVENTION

It is an object of an aspect of the present invention to provide a battery module having an improved sensing structure.

Another object of an aspect of the present invention to provide a battery module having an improved space efficiency.

To achieve the above objects, according to an aspect of the present invention, there is provided a battery module including: a plurality of battery cells which have positive electrode tabs and negative electrode tab formed at both ends thereof, respectively, wherein the plurality of battery cells are stacked; a first bus bar assembly having first bus bars to which the positive electrode tabs and the negative electrode tabs located at one end of the battery cells are connected; a second bus bar assembly having second bus bars to which the positive electrode tabs and the negative electrode tabs located at the other end of the battery cells are connected; and a sensing unit which is connected to any one bus bar of the first and second bus bars to detect states of the battery cells.

The first and second bus bar assemblies may be disposed at one end and the other end of the battery cells, respectively, and may be connected to the battery cells to be spaced apart from each other.

The sensing unit may include: a circuit board which is mounted on any one bus bar of the first and second bus bars; and a plurality of connection parts which extend from the circuit board and are connected to the any one bus bar.

The sensing unit may further include: a temperature sensor which extends from the circuit board to one side of the battery cells to measure temperatures of the battery cells.

The first bus bar assembly may include: a first terminal plate which is electrically connected to the first bus bars to form a first terminal having a first positive electrode terminal and a first negative electrode terminal, and the second bus bar assembly may include: a second terminal plate which is electrically connected to the second bus bars to form a second terminal having a second positive electrode terminal and a second negative electrode terminal.

The first terminal and the second terminal may be configured to operate independently of each other.

According to an aspect of the present invention, space efficiency may be improved by mounting the sensing unit on only one side of the battery module.

According to an aspect of the present invention, energy density may be maximized by improving the cell structure and arrangement structure of the battery module.

According to an aspect of the present invention, it is possible to minimize an internal resistance of the battery module and maximize a cooling performance of the battery module.

According to an aspect of the present invention, it is possible to simplify the configuration of the battery module and reduce costs thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
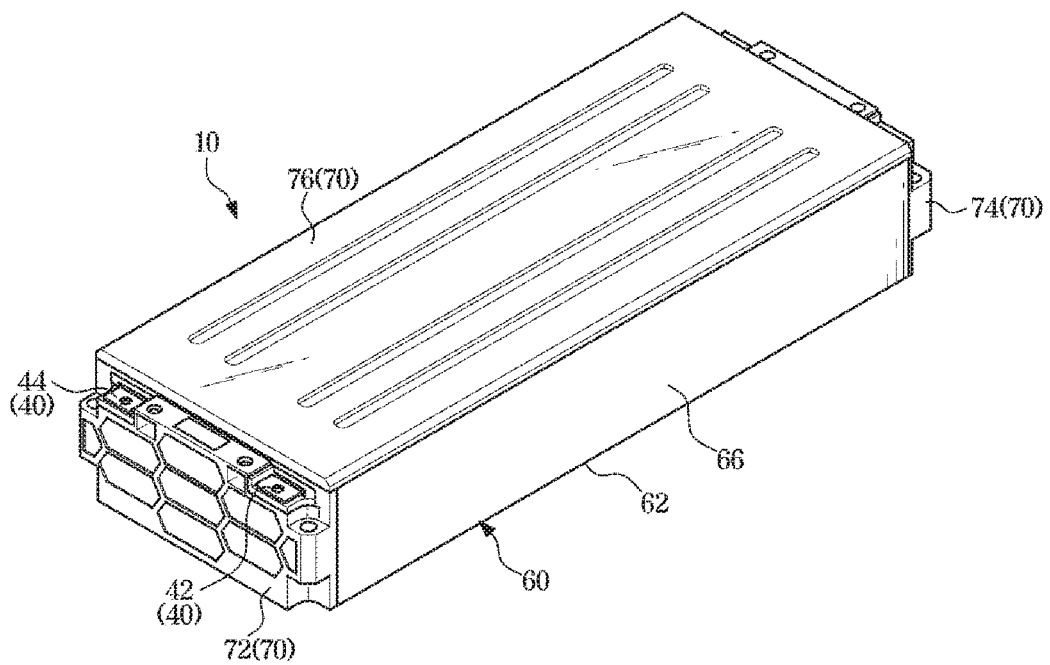
FIG. 1 is a perspective view of a battery module according to an embodiment of the present invention.

Configurations illustrated in the embodiments and drawings of the present disclosure are only preferred examples of the invention, and diverse modifications capable of replacing the embodiments and drawings of the present disclosure may be possible at a time of filing the present application.

Further, the same reference numerals or symbols in the drawings of the present disclosure will represent parts or components having substantially the same functions.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, the terms including numerals such as "first," "second," etc. in the present disclosure may be used to explain different components, but such components are not limited thereto. These terms are used only to distinguish one component from other components. For example, a first component may also be named a second component without departing from the scope of the present invention. Likewise, the second component may also be named the first component. The term "and/or" may include a combination of a plurality of related items and/or any one among the plurality of related items.

In addition, the terms such as a "part," "device," "block," "member," "module," and the like may refer to a unit to execute at least one function or operation. For example, the terms may refer to at least one hardware such as a field-programmable gate array (FPGA) or an application specific integrated circuit (ASIC), at least one operating process performed by at least one software stored in a memory or processor.

Hereinafter, embodiments according to the present invention wall be described in detail with reference to the accompanying drawings.

Figure 2:
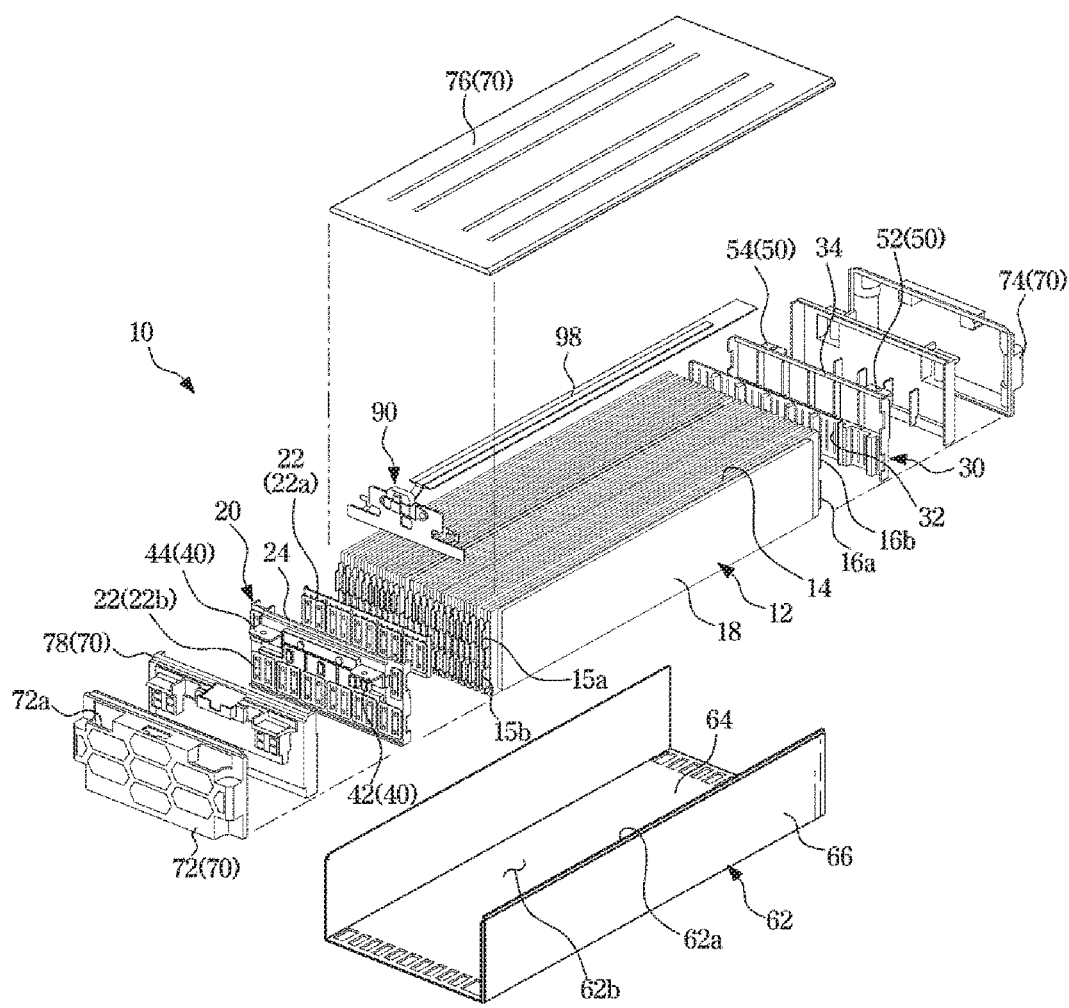
FIG. 2 is an exploded perspective view of the battery module according to an embodiment of the present invention.

FIG. 1 is a perspective view of a battery module according to an embodiment of the present invention, and FIG. 2 is an exploded perspective view of a battery module according to an embodiment of the present invention.

A battery module 10 may include a battery stack 12 in which pouch battery cells 14 are stacked, and bus bar assemblies 20 and 30 which electrically connect the battery cells 14 forming the battery stack 12 to each other, and a module case 60 which houses and protects the battery stack 12 and bus bars 22 and 33.

The battery stack 12 formed by stacking the battery cells 14 will be described in detail below.

The bus bar assemblies 20 and 30 may include the bus bars 22 and 32 and terminal plates 24 and 34.

The bus bars 22 and 32 are formed at both ends of the battery stack 12, and may electrically connect electrode tabs 15a, 15b, 16a and 16b of the plurality of battery cells 14 to each other.

The bus bars 22 and 32 may be coupled to one end and the other end of the battery stack 12, respectively, such that each pair of electrode tabs 15a, 15b, 16a, and 16b respectively formed at both ends of the battery cell 14 may be electrically connected to each other.

The terminal plates 24 and 34 are provided to be electrically connected with the bus bars 22 and 32, and form terminals 40 and 50 which are exposed to an outside. The terminal plates 24 and 34 connected with the bus bars 22 and 32 may form a first positive electrode terminal 42 and a first negative electrode terminal 44 at one end of the battery stack 12, and a second positive electrode terminal 52 and a second negative electrode terminal 54 at the other end of the battery stack 12. The first positive electrode terminal 42 and the first negative electrode terminal 44 may be defined as a first terminal 40, and the second positive electrode terminal 52 and the second negative electrode terminal 54 may be defined as a second terminal 50. That is, the first positive electrode terminal 42 and the first negative electrode terminal 44 provided at one end of the battery module 10 may be referred to as the first terminal 40, and the second positive electrode terminal 52 and the second negative electrode terminal 54 provided at the other end of the battery module 10 may be referred to as the second terminal 50, respectively. The first and second positive electrode terminals 42 and 52; and the first and second negative electrode terminals 44 and 54 are configured so that terminals having the same polarity are disposed on the same side in a length direction of the battery module 10. That is, the first and second positive electrode terminals 42 and 52; and the first and second negative electrode terminals 44 and 54 may be symmetrically disposed on both ends of the battery module 10. When the positive electrode terminals 42 and 52 are disposed close to one side of the battery module 10, the negative electrode terminals 44 and 54 may be disposed close to the other side of the battery module 10.

The battery module 10 may be formed to have a smaller width in a width direction perpendicular to the length direction than a length in the length direction running from the first terminal 40 to the second terminal 50. In the present embodiment, the battery module 10 has a length longer than the width, and the positive electrode terminals and the negative electrode terminals may be disposed at both ends thereof, respectively.

The terminal plates 24 and 34 may be provided to be coupled to the bus bars 22 and 32 in a separate configuration, or may be integrally formed therewith. In the present embodiment, it is illustrated that the bus bar 22 is divided into an upper bus bar 22a and a lower bus bar 22b, wherein the upper bus bar 22a is disposed on a surface of the terminal plate 24 facing the battery stack 12, and the lower bus bar 22b is disposed on a front surface of each of the terminal plates 24 and 34. However, it is not limited thereto. Any configuration may be used so long as it satisfies that the bus bars 22 and 32 electrically connect a plurality of electrode tabs 15a, 15b, 16a and 16b to each other, and the terminal plates 24 and 34 are electrically connected to the bus bars 22 and 32 to form the positive electrode terminals 42 and 52 and the negative electrode terminals 44 and 54.

The module case 60 may form an appearance of the battery module 10. The module case 60 may include a case body 62 forming a placing space 62b, and a case cover 70 coupled to the case body 62. The case body 62 may include an opening 62a communicating with the placing space 62b, and the case cover 70 may be configured to cover the opening 62a. The case cover 70 may include a front cover 72 and a rear cover 74 coupled to the front and rear of the case body 62, and an upper cover 76 coupled to an upper portion of the case body 62.

The front and rear covers 72 and 74 may be configured to be coupled to the outside of the terminal plates 24 and 34, thus to cover the terminal plates 24 and 34, respectively. The case cover 70 may further include an insulation cover 78 disposed between the front and rear covers 72 and 74 and the terminal plates 24 and 34. The insulation cover 78 may be made of an insulation material. The front and rear covers 74 may include opening portions 72a which are opened so that the terminals are exposed to the outside. The positive electrode terminals 42 and 52 and the negative electrode terminals 44 and 54 formed in the terminal plates 24 and 34 may be exposed to the outside of the front and rear covers 74 through the opening portions 72a.

The case body 62 may include a lower case 64 forming a bottom surface, and side cases 66 extending from the lower case 64 to form side surfaces. In the present embodiment, the case body 62 has a cross-section in a shape of a "U" and is provided so that the front and rear sides and an upper portion thereof are opened. However, it is not limited thereto, and the case body 62 may be provided to have a 'square-shaped' cross section, and the front and rear sides thereof are opened. Any structure may be used so long as it satisfies that the case body 62 forms the placing space 62b in which a plurality of battery cells 14 are placed. The battery stack 12 may include a buffer member 18 which is disposed on the outermost side thereof, and is disposed between an inner surface of the side case 66 and the battery cell 14 at the outermost side thereof to function as a buffer.

The case body 62 and the case cover 70 may protect the respective components, which are electrically connected to each other, such as the battery stack 12, the bus bars 22 and 32, and the terminals in the battery module 10.

The battery module 10 may include a sensing unit 90. The sensing unit 90 will be described in detail below.

The battery module 10 may include a cooling member (not illustrated). The cooling member is not illustrated in the drawings, but may be disposed to cover the case body 62 and the case cover 70. Through this, cooling of the battery cell 11 may be performed in multiple directions. In the present embodiment, since the first and second terminals 40 and 50 independently activate in the battery module, a separate configuration for electrically connecting the first and second terminals 40 and 50 may be omitted. Through this configuration, it is possible to freely set the arrangement of the cooling member with respect to the battery module. For example, a cooling member may be disposed around the battery module 10 located between the first and second terminals 40 and 50, that is, on at least one of the lower case, the side case and the upper cover, and the cooling members may be disposed on all the lower case, the side case and the upper cover. The cooling member may be formed in surface contact with at least one of the lower case, the side case and the upper cover.

Figure 3:
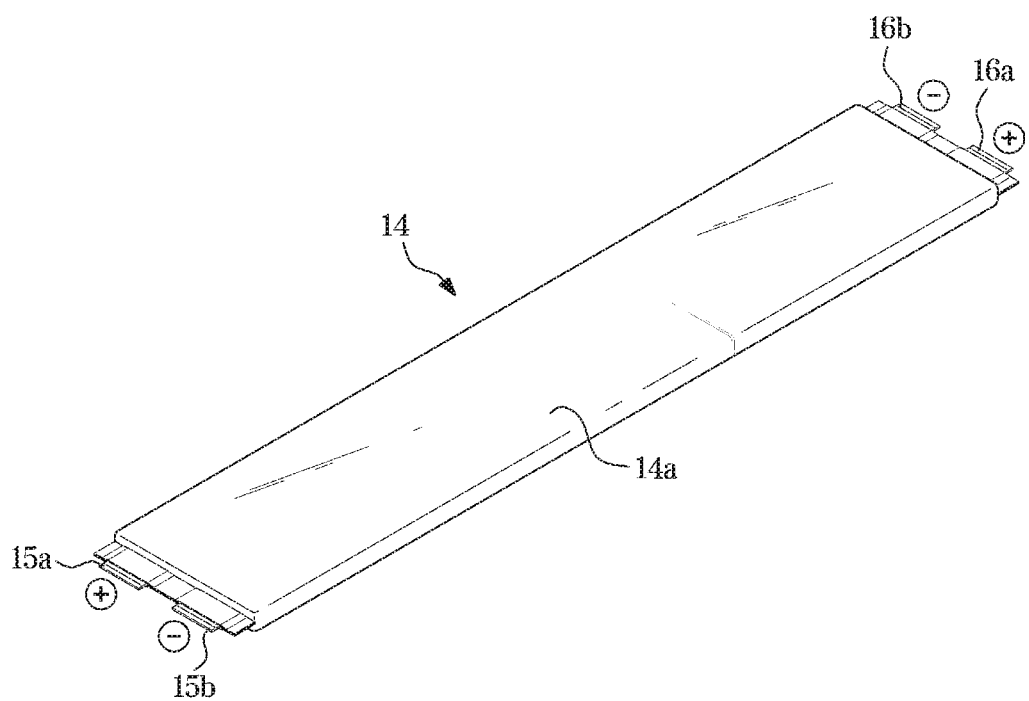
FIG. 3 is a perspective view of a battery cell in the battery module according to an embodiment of the present invention.
Figure 4:
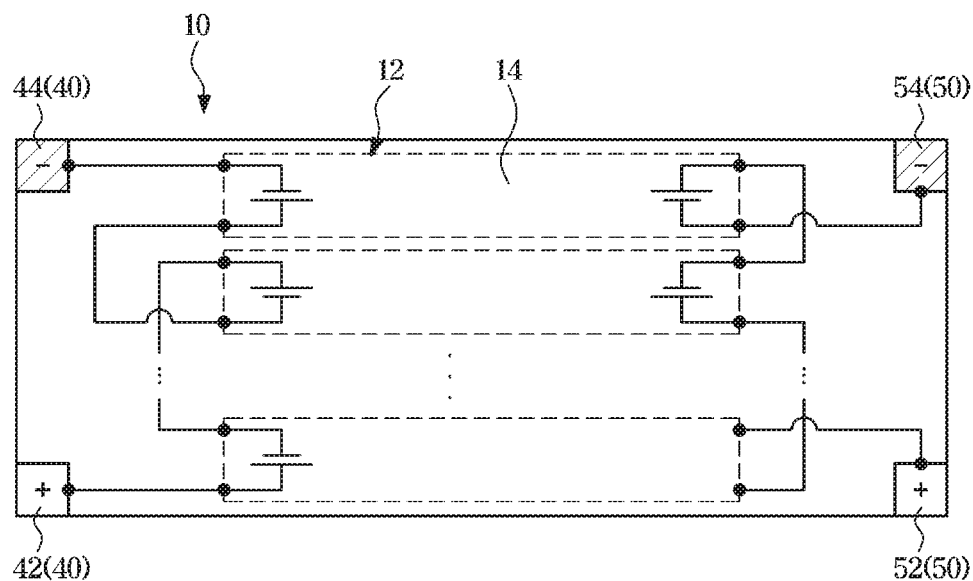
FIG. 4 is a diagram schematically illustrating the battery module according to an embodiment of the present invention.

FIG. 3 is a perspective view of a battery cell in the battery module according to an embodiment of the present invention, and FIG. 4 is a diagram schematically illustrating the battery module according to an embodiment of the present invention.

The battery cell 14 may be formed in a long width or ultra-long width in which an edge length between the electrode tabs in the length direction is much longer than a length of the edge where the electrode tabs 15a, 15b, 16a, and 16b are located.

The battery cells 14 may include an electrode assembly (not illustrated) from which the electrode tabs 15a, 15b, 16a, and 16b are drawn out, and an exterior material 14a for housing the electrode assembly. The electrode assembly may be formed in a wound type in which one or more of positive electrode plates and negative electrode plates are wound together with a separator, or a stack type in which a plurality of positive electrode plates and a plurality of negative electrode plates are alternately stacked with the separator interposed therebetween. The exterior material 14a is configured in a form including an outer insulation layer, a metal layer, and an inner adhesive layer, and may house internal components such as an electrode assembly and an electrolyte.

In a case of a structure in which the electrode tabs are formed one by one at both ends of the battery cell 14, if the width of the battery cell 14 is increased, the length between the electrode tabs in the width direction is also increased, thereby causing an increase in an internal resistance of the battery cell 11. In addition, when the positive electrode tab and negative electrode tab are arranged and activated only at one end of the battery cell 14, a current density in a specific region of the one end having the activated electrode tabs is increased, such that the specific region of the battery cell 14 is overheated compared to other regions, and the current density is increased. Thereby, a problem, in which a surface pressure is increased and dendrite is formed, may occur.

To this end, the battery cell 14 in the present invention may include a first positive electrode tab 15a and a first negative electrode tab 15b, which are formed at one end thereof, and a second positive electrode tab 16a and a second negative electrode tab 16b, which are formed at the other end thereof. That is, the battery cell 14 according to the present embodiment may have the positive electrode tabs 15a and 16a and the negative electrode tabs 15b and 16b, which are located at both ends thereof, respectively. The first positive electrode tab 15a and the first negative electrode tab 15b, and the second positive electrode tab 16a and the second negative electrode tab 16b may be arranged in a left-right reversed form. Through this configuration, the positive electrode tabs 15a and 16a and the negative electrode tabs 15b and 16b allow a current to flow through the tabs having a short distance therebetween, such that the internal resistance of the battery cell 14 may be minimized.

The battery stack 12 may be formed by stacking the plurality of battery cells 14. In order to obtain a voltage higher than that of a single battery cell 14, the electrode tabs 15a, 15b, 16a and 16b in the battery stack 12 may be connected to each other in series by the bus bar assemblies 20 and 30. As shown in FIG. 1, the battery cells 14 may be configured so that the positive electrode tabs 15a and 16a and the negative electrode tabs 15b and 16b are alternately arranged in a stacking direction. In addition, the battery cells 14 may be stacked in a horizontal direction, that is, in the width direction of the battery module 10 to form the battery stack 12. However, the arrangement and stacking directions of the battery cells 14 are not limited thereto.

Referring to FIG. 2, the bus bar assemblies 20 and 30 may include a first bus bar assembly 20 disposed at one end of the battery module 10 and a second bus bar assembly 30 disposed at the other end of the battery module 10. The first and second bus bar assemblies 20 and 30 are disposed at one end and the other end of the battery module 10 to be spaced apart from each other, respectively, to form independent positive electrode terminals 42 and 52 and negative electrode terminals 44 and 54.

The first bus bar assembly 20 may include first bus bars and a first terminal plate 24. The first positive electrode tab 15a and the first negative electrode tab 15b located at one end of the battery stack 12 may be connected to each other in series through the first bus bars 22.

The first terminal plate 24 may be connected to the first bus bars 22 to which the first positive electrode tab 15a and the first negative electrode tab 15b are connected to form a first positive electrode terminal 42 and a first negative electrode terminal 44.

The second bus bar assembly 30 may include second bus bars 32 and a second terminal plate 34. The second positive electrode tab 16a and the second negative electrode tab 16b located at the other end of the battery stack 12 may be connected to each other in series through the second bus bars 32.

The second terminal plate 34 may be connected to the second bus bars 32 to which the second positive electrode tab 16a and the second negative electrode tab 16b are connected to form a second positive electrode terminal 52 and a second negative electrode terminal 54. The first and second positive electrode terminals 42 and 52; and the first and second negative electrode terminals 44 and 54 of the battery module 10 may be electrically connected to the terminals of another battery module adjacent thereto.

The battery module 10 has an advantage that, since all the first and second positive electrode terminals 42 and 52; and the first and second negative electrode terminals 14 and 54 are activated, when only the electrode tabs coupled to any one terminal are activated, a temperature imbalance phenomenon generated due to a concentration of the current may be minimized, and the formation of dendrite may be prevented.

Further, in the battery module 10, the first positive electrode terminal 42 and the first negative electrode terminal 44 as the first terminal 40, and the second positive electrode terminal 52 and the second negative electrode terminal 54 as the second terminal 50 may operate independently. Through this configuration, a separate configuration for electrically connecting the first and second terminals may be omitted. That is, since the configuration of directly connecting the first and second terminals can be omitted, the cooling member may be applied to at least one side surface of side surfaces forming four sides of the battery stack 12 located between the first and second terminals, or otherwise, cooling members may be applied to all the side surfaces correspond to the four sides.

Figure 5:
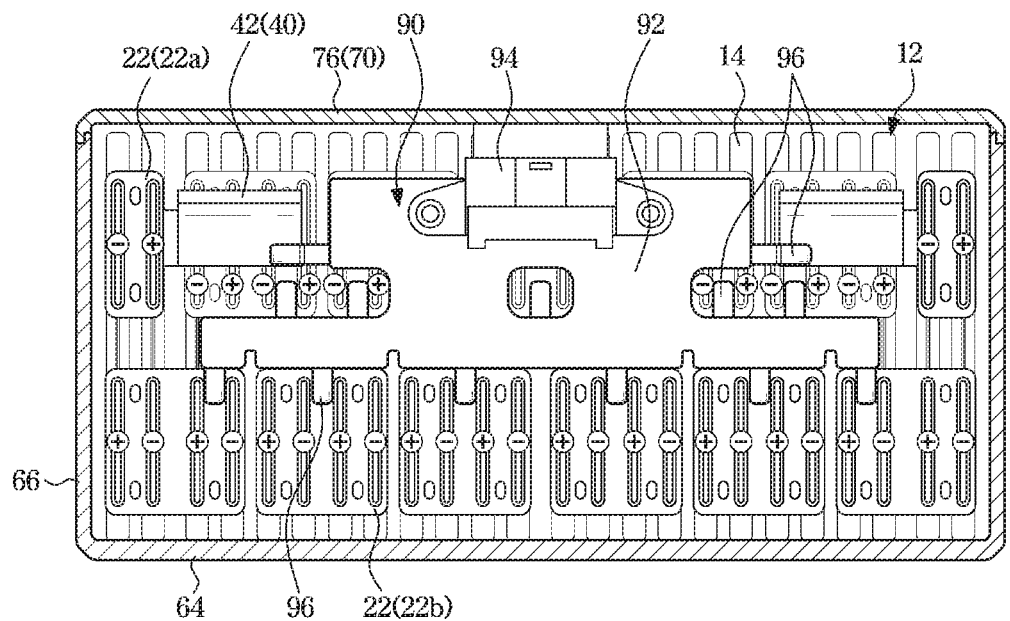
FIG. 5 is a front view of the battery module according to an embodiment of the present invention.

FIG. 5 is a front view of the battery module according to an embodiment of the present invention.

The battery module 10 may include a sensing unit 90.

The plurality of battery cells 14 are electrically connected to each other, and states of the connected battery cells 14 should be monitored. The sensing unit 90 may detect the states of the battery cells 14. The states of the battery cells 14 detected by the sensing unit 90 may include various information including temperature information as well as a voltage state. The sensing unit 90 is connected to a temperature sensor 98 disposed inside the battery module 10 to monitor the temperature information of the battery cells 14.

The sensing unit 90 may be connected to the battery cells 14 through the bus bars 22 and 32, rather than directly connecting thereto. However, it is not limited thereto, and the sensing unit 90 may be configured to be directly connected to the battery cell 14.

As shown in FIG. 2, the sensing unit 90 may be disposed on an outer surface of one side of the battery stack 12. The sensing unit 90 may be mounted on any one bus bar of the first and second bus bars 22 and 32. Since the first positive electrode tab 15a and the first negative electrode tab 15b at one end of the battery cells 14, and the second positive electrode tab 16a and the second negative electrode tab 16b at the other end of the battery cells 14 operate independently of each other, the sensing unit 90 may detect the states of the battery cells 14 even if it is mounted on only one bus bar of the first and second bus bars 22 and 32. By mounting the sensing unit 90 on only one bus bar of the first and second bus bars 22 and 32, a separate configuration such as an FPCB for electrically connecting one end and the other end of the battery cells 14 may be omitted.

The sensing unit 90 may include a circuit board 92 mounted on the bus bar assemblies 20 and 30. The circuit board 92 may include a circuit for sensing the states of the battery cells 14.

The circuit board 92 may include a connector 94 and a plurality of connection parts 96. The connector 94 may be provided to transmit status information of the plurality of battery cells 14 to an outside. The connector 94 for transmission may be coupled to the connector 94 of the circuit board 92 to transmit the status information to the outside through a wire connected to the connector 94 for transmission.

The plurality of connection parts 96 are connected to the circuit board 92 and may be formed in a plurality of leg shapes. The plurality of connection parts 96 may be electrically connected to any one bus bar of the first and second bus bars 22 and 32. The plurality of connection parts 96 are connected to the bus bars 22 and 32, and are provided to collect the status information of the battery cells 14 and transmit them to the circuit board 92.

As such, specific embodiments of the present invention have been illustrated and described in detail. However, the present invention is not limited to the above embodiments, and it will be understood by those skilled in the art that various alterations and modifications may be implemented without departing from technical spirits of the invention described is the following claims.

DESCRIPTION OF REFERENCE NUMERALS

10: Battery module
12: Battery stack
14: Battery cell
20, 30: Bus bar assembly
22, 24: Bus bar
24, 34: Terminal plate
40, 50: Terminal
42, 44: Positive electrode terminal
52, 54: Negative electrode terminal
60: Module case
62: Case body
70: Case cover
90: Sensing unit

What is claimed is:

1. A battery module comprising:
a plurality of battery cells stacked, wherein each of the plurality of battery cells including first electrode tabs formed at one end thereof, and second electrode tabs formed at the other end thereof;
a first bus bar assembly having first bus bars to which the first electrode tabs are connected;
a second bus bar assembly having second bus bars to which the second electrode tabs are connected; and
a sensing unit which is connected to one bus bar of the first and second bus bars to detect states of the battery cell,
wherein the first bus bars comprise,
at least one first upper bus bar; and
at least one first lower bus bar placed under the first upper bus bar;
wherein the second bus bars comprise,
at least one second upper bus bar; and
at least one second lower bus bar placed under the second upper bus bar;
wherein the first electrode tabs comprise,
a first positive electrode tab connected to one of the first upper bus bar and the first lower bus bar; and a first negative electrode tab connected to the other of the first upper bus bar and the first lower bus tab, wherein the second electrode tabs comprise, a second positive electrode tab connected to one of the second upper bus bar and the second lower bus bar; and a second negative electrode tab connected to the other of the second upper bus bar and the second lower bus bar.

2. The battery module according to claim 1, wherein the first and second bus bar assemblies are disposed at one end and the other end of the battery cell, respectively, and are connected to the battery cell to be spaced apart from each other.

3. The battery module according to claim 2, wherein the first and second bus bar assemblies are each independently activated.

4. The battery module according to claim 3, wherein the sensing unit is connected to only one of the first and second bus bars of the independent first and second bus bar assemblies to detect the states of the battery cell.

5. The battery module according to claim 1, wherein the sensing unit comprises:

a circuit board which is mounted on the one bus bar of the first and second bus bars; and a plurality of connection parts which extend from the circuit board and are connected to the one bus bar.

6. The battery module according to claim 5, wherein the sensing unit further comprises:

a temperature sensor which extends from the circuit board to one side of the battery cell to measure temperatures of the battery cell.

7. The battery module according to claim 1, wherein the first bus bar assembly comprises:

a first terminal plate which is electrically connected to the first bus bars to form a first terminal having a first positive electrode terminal and a first negative electrode terminal, and the second bus bar assembly comprises:

a second terminal plate which is electrically connected to the second bus bars to form a second terminal having a second positive electrode terminal and a second negative electrode terminal.

8. The battery module according to claim 7, wherein the first terminal and the second terminal are configured to operate independently of each other.

9. The battery module according to claim 7, wherein the first and second terminals are electrically disconnected from each other and are activated independently.

10. The battery module according to claim 1, wherein the battery cell has a pair of second edges formed between a pair of first edges longer than the pair of first edges in which the electrode tabs are located.

11. The battery module according to claim 1, wherein the plurality of battery cells are stacked so that the first positive electrode tab and the first negative electrode tab are alternately disposed in a direction in which the plurality of battery cells are stacked, wherein the plurality of battery cells are stacked so that the second positive electrode tab and the second negative electrode tab are alternately disposed in the direction in which the plurality of battery cells are stacked.

* * * * *